United States Patent [19]

Yamamoto et al.

[11] Patent Number: 5,496,509
[45] Date of Patent: Mar. 5, 1996

[54] METHOD FOR PRODUCING MOLDED PRODUCT

[75] Inventors: Naotaka Yamamoto; Nobuo Yagi, both of Fujisawa; Satoshi Fujii, Komaki; Kenji Yonemochi, Komaki; Mitsutoshi Myokei, Komaki, all of Japan

[73] Assignees: Dai Nippon Toryo Co., Ltd., Osaka; Isuzu Motors Limited, Tokyo, both of Japan

[21] Appl. No.: 312,074

[22] Filed: Sep. 26, 1994

Related U.S. Application Data

[63] Continuation of Ser. No. 961,822, Oct. 16, 1992, abandoned.

[30] Foreign Application Priority Data

Oct. 16, 1991 [JP] Japan ................................. 3-267801

[51] Int. Cl.⁶ ........................... B29C 45/16; B29D 9/00
[52] U.S. Cl. .......................... 264/129; 264/135; 264/255; 264/257; 264/328.5
[58] Field of Search ........................ 264/257, 255, 264/260, 261, 241, 328.1, 328.5, 129, 135, 136, 137

[56] References Cited

U.S. PATENT DOCUMENTS

| | | | |
|---|---|---|---|
| 3,616,185 | 10/1971 | Goldberg | 264/257 |
| 4,073,828 | 2/1978 | Ferrarini et al. | 264/294 |
| 4,123,488 | 10/1978 | Lawson . | |
| 4,189,517 | 2/1980 | Shanoski et al. | 264/241 |
| 4,214,016 | 7/1980 | Manabe et al. | 427/512 |
| 4,245,006 | 1/1981 | Shanoski | 264/255 |
| 4,350,739 | 9/1982 | Mohiuddin | 264/328.18 |
| 4,438,002 | 3/1984 | Griffith et al. | 264/255 |
| 4,477,405 | 10/1984 | Makhlouf et al. | 264/255 |
| 4,603,181 | 7/1986 | Nishino et al. . | |
| 4,610,835 | 9/1986 | Ghavamikia | 264/255 |
| 4,781,876 | 11/1988 | Kia | 264/255 |

FOREIGN PATENT DOCUMENTS

| | | |
|---|---|---|
| 0039588 | 11/1981 | European Pat. Off. . |
| 0197496 | 10/1986 | European Pat. Off. . |
| 0283108 | 9/1988 | European Pat. Off. . |
| 2108987 | 5/1983 | United Kingdom . |

OTHER PUBLICATIONS

Database WPIL, AN 90–063385, JP–A–2 016 562, Jan. 19, 1990.
Database WPIL, AN 8207111E, JP–A–56 163 263, Dec. 15, 1981.
Database WPIL, AN 85–187481, JP–A–60 116 415, Jun. 22, 1985.

Primary Examiner—Jay H. Woo
Assistant Examiner—Duane S. Smith
Attorney, Agent, or Firm—Oblon, Spivak, McClelland, Maier & Neustadt

[57] ABSTRACT

A method for preparing a molded product which includes (i) molding a fiber-reinforced plastic material in a mold, (ii) injecting a coating composition into the mold, the coating composition containing a vehicle component including urethane acrylate oligomer and epoxy acrylate oligomer as the main ingredients and a filler component including calcium carbonate as the main ingredient, and (iii) taking the coated molded product from the mold and plating the surface of the product. According to the present invention, there can be obtained a molded product having a plated layer with a satisfactory smooth and uniform glossy surface and having an improved adhesion between the molded product and the plated layer.

9 Claims, No Drawings

METHOD FOR PRODUCING MOLDED PRODUCT

This application is a continuation of application Ser. No. 07/961,822, filed Oct. 16, 1992, now abandoned.

The present invention relates to a method for producing a plated plastic molded product excellent in gloss, smoothness and adhesive properties.

Recently, since fiber reinforced plastic (hereinafter referred to as "FRP") molded products are excellent in rigidity, mechanical strength and moldability and are light, they are widely used as substitutes for metals in the fields of outer panels or parts of automobiles, housing parts, electrical parts and the like. When a metallic outer appearance is imparted to an FRP molded product, it is usual to plate the FRP molded product.

However, the FRP molded products often have surface defects such as porosities, pin holes and minute cracks, and it is therefore very difficult to form a plated layer having excellent surface gloss, smoothness, adhesive properties and the like even by directly plating. (Japanese Unexamined Patent Publication Nos. 181275/1985 and No. 14896/1988)

Under these circumstances, in order to remove the above-mentioned conventional problems, the present inventors have studied to develop a method for producing an FRP molded product having a plated layer excellent in surface gloss, smoothness and adhesive properties, and have achieved the present invention.

Thus, the present invention relates to a method for producing a molded product, which comprises:

(i) molding a fiber-reinforced plastic material in a mold in the presence of heat under pressure;

(ii) injecting a coating composition into the mold to form a coated film on the surface of the molded product in the presence of heat under pressure, said coating composition containing (a) a vehicle component comprising a polymerizable unsaturated monomer and an oligomer mixture of urethane acrylate oligomer/epoxy acrylate oligomer at a weight ratio of from 90/10 to 10/90 as the main ingredients and (b) a filler comprising calcium carbonate as the main ingredient, the content of said oligomer mixture being from 20 to 60% by weight and the content of calcium carbonate being from 10 to 50% by weight; and then (iii) taking the coated molded product thus obtained out of the mold and plating the surface of the molded product.

Hereinafter, the present invention is further explained in more details.

Examples of the FRP materials used in the present invention include sheet molding compound (SMC), bulk molding compound (BMC) and the like. More concretely, typical examples of the fiber-reinforced plastic materials comprise a thermoset resin matrix such as unsaturated polyester resin, vinyl ester resin, phenol resin or epoxy resin, and a reinforcing fiber such as glass fiber, carbon fiber or mineral fiber.

The coating composition used in the present invention contains (a) a vehicle component comprising a polymerizable unsaturated monomer and an oligomer mixture of urethane acrylate oligomer and epoxy acrylate oligomer as the main ingredients, (b) a filler comprising calcium carbonate as the main ingredient, and a polymerization initiator, as the essential components, and further optionally contains a modifier resin, a releasing agent and other various additives.

A typical example of the urethane acrylate oligomer includes a reaction product having a number average molecular weight of about 300 to 3000 prepared by reacting (a) an organic diisocyanate, (b) an organic diol and (c) a hydroxy-containing (meth)acrylate, which does not substantially contain an unreacted isocyanate group. That is, the typical example includes a reaction product obtained by mixing and reacting the above-mentioned components (a), (b) and (c) at the same time; a reaction product obtained by reacting the components (a) and (b) to form an isocyanate group-containing urethane isocyanate intermediate and then reacting the intermediate with the component (c); and a reaction product obtained by reacting the components (a) and (c) to form an isocyanate group-containing urethane (meth)acrylate intermediate and then reacting the intermediate with the component (b).

Examples of the component (a) include an alicyclic isocyanate such as isophorone diisocyanate, methylcyclohexane diisocyanate and hydrogenated xylylene diisocyanate; an aromatic isocyanate such as tolylene diisocyanate and xylylene diisocyanate; and an aliphatic isocyanate such as hexamethylene diisocyanate and trimethylene hexane diisocyanate.

Examples of the component (b) include an alkylene diol such as ethylene glycol, propylene glycol, polyethylene glycol and polypropylene glycol; and a polyester diol such as an esterification product of an excess amount of an alkylene diol with a dicarboxylic acid or its anhydride.

Examples of the component (c) include 2-hydroxyethyl (meth)acrylate, 2-hydroxypropyl (meth)acrylate, 4-hydroxybutyl (meth)acrylate and 3-chloro-2-hydroxypropyl (meth)acrylate.

The epoxy acrylate oligomer is prepared by reacting a polyepoxide with a stoichiometrically equivalent amount of acrylic acid or methacrylic acid as described in U.S. Pat. Nos. 3,301,743 and 3,373,075.

Examples of the polyepoxide used include conventionally known polyepoxides having two or more epoxy groups and preferably having a number average molecular weight of about 300 to 3000, typical examples of which include a bisphenol type polyepoxide obtained by reacting epichlorohydrin with bisphenol A, bisphenol F, bisphenol C, bisphenol S or the like; a novolak type polyepoxide obtained by reacting epichlorohydrin with novolak resin; a cycloaliphatic polyepoxide obtained by epoxidizing a reaction product of butadiene and croton aldehyde with peracetic acid or their mixture. However, the usable polyepoxide should not be limited to the above-mentioned examples.

The polymerizable unsaturated monomer has a function as a viscosity modifier for the coating composition, and is blended to be radical-polymerized with a polymerizable unsaturated group in the above-mentioned oligomer to form a homogeneous cured film.

Typical examples of the polymerizable unsaturated monomers include such as styrene, α-methylstyrene, divinylbenzene and vinyltoluene; (meth)acrylic acid esters such as methyl (meth)acrylate, ethyl (meth)acrylate, propyl (meth)acrylate and butyl (meth)acrylate; di- or tri-(meth)acrylates of ethylene glycol, diethylene glycol or trimethylol propane; functional group-containing monomers such as (meth)acrylic acid, hydroxyethyl (meth)acrylate, hydroxybutyl (meth)acrylate and glycidyl (meth)acrylate; and the like.

The vehicle component (a) comprises the abovementioned urethane acrylate oligomer, epoxy acrylate oligomer and polymerizable unsaturated monomer. The urethane acrylate oligomer is mixed with the epoxy acrylate oligomer preferably in a weight ratio ranging from 90/10 to 10/90. If the amount of the urethane acrylate oligomer is blended in a larger amount than the above range, the coated film is degraded by an etching liquor in the succeeding plating step and the gloss and the smoothness of the plated surface become unpreferably poor. On the other hand, if the epoxy acrylate oligomer is blended in a larger amount than the above-mentioned range, the coated film is hardly etched by the etching liquor, and consequently, the adhesive properties of the plated layer become unpreferably poor.

The oligomer mixture is preferably blended in an amount of from 20 to 60% by weight in the coating composition in order to achieve satisfactory coating properties including adhesive properties between the molded product base and the plated layer. An appropriate weight ratio of the oligomer mixture/the polymerizable unsaturated monomer ranges preferably from 30/70 to 90/10, and the total amount of the two components ranges preferably from 30 to 70% by weight in the coating composition.

The filler is blended to disperse shrinkage stress caused when curing the coated film, to improve adhesive properties between the coated film and the molded product base and to fill the above-mentioned porosities present on the surface of the molded product base, thereby improving the smoothness and the outer appearance.

Particularly, in the present invention, it is necessary to use calcium carbonate as a part or the whole part of the filler in order to make the coated film easily etchable by the above-mentioned etching liquor. Calcium carbonate is blended preferably in an amount of from 10 to 50% by weight in the coating composition.

It is possible to use the other fillers such as color pigments and extender pigments generally used for plastics and paints, but the filler preferably has an average particle size of not larger than 10 μm in order to improve the gloss and the smoothness of the plated surface.

Examples of the color pigments include powdery pigments such as white type titanium oxide; yellow type benzidine yellow, titanium yellow and Hansa yellow; orange type molybdate orange, chrome yellow and benzidine orange; red type quinacridone and marune; green type chrome green and chrome oxide green; blue type ultramarine blue, cobalt blue and ultramarine; and black type carbon black and iron oxide or flake-like pigments such a flake-like mica treated with titanium oxide, nickel or iron oxide. Examples of the extender pigments include talc, barium sulfate, aluminum hydroxide, clay and the like.

The polymerization initiator generates free radicals, and is used to polymerize the above-mentioned vehicle component. Examples of the polymerization initiator include tertiary butyl peroxy benzoate, tertiary butyl peroxy octoate, methyl ethyl ketone peroxide, tertiary benzyl peroxy benzoate, dicumyl peroxide, cumyl hydroperoxide, diacetyl peroxide, caprylyl peroxide, tertiary butyl hydroperoxide and the like. The polymerization initiator is blended in an amount of from 0.1 to 5% by weight to the vehicle component.

The modifier resin optionally blended, is used to improve the dispersibility of the pigment, the flowability in the mold and the storage stability, or to improve the flexibility, adhesiveness and etching properties of the coated film.

The modifier resin is preferably dissolved or stably dispersed in the polymerizable unsaturated monomer, and typical examples of the modifier resin include thermoplastic or thermosetting polymers such as saturated polyester, polystyrene, polyvinyl acetate, polyvinyl acetate-acryl copolymer, polyvinyl chloride, polyvinyl chloride-vinyl acetate copolymer, polyvinyl chlorideacryl copolymer, polyacrylate, polystyrene-butadiene copolymer, polyester, butyral resin, melamine resin, rosin and cellulose. It is possible to blend the modifier resin in an amount of up to 30% by weight in the coating composition.

The releasing agent is used to satisfactorily release the cured film from the mold, and typical examples of the releasing agent include stearic acid salts of zinc, aluminum, magnesium or calcium, lecithin, alkyl phosphate and the like. The releasing agent is blended preferably in an amount of from 0.05 to 2% by weight in the coating composition.

Furthermore, it is possible to optionally blend various additives such as a cure-accelerator, a dispersing agent, an anti-settling agent, a flow-assistant and a polymerization inhibitor.

The coating composition used in the present invention comprises the above-mentioned components as explained above.

Hereinafter, a method for preparing a molded product of the present invention is explained.

Examples of the molding process used in the present invention include injection molding process, compression molding process, transfer molding process and the like, but a preferable molding process is a process as described in Japanese Unexamined Patent Publication No. 273921/1986 and Japanese Examined Patent Publication No. 9291/1980.

That is, a molded product having a desired shape is prepared by fitting one mold (hereinafter referred to as "upper mold") to the other mold (hereinafter referred to as "lower mold") to produce a cavity space between the molds having a desired shape of a molded product, charging an FRP material (e.g. SMC or BMC) into the cavity space, and heating and pressurizing the molds to melt and heat-cure the FRP material.

The heat-molding temperature is optionally determined depending on molding time and types of FRP materials used, but is generally from 130° to 200° C. It is preferable to previously adjust the molds to the abovementioned temperature before charging the FRP material and to maintain the temperature until a cured coating film is obtained.

The molding pressure is optionally determined depending on the heating temperature and the types of FRP materials used, but is generally from 50 to 250 kgf/cm$^2$.

The molding time may be adjusted so as to completely heat-cure the FRP material, but may be adjusted so as to produce a molded product of the FRP material having such a strength that the shape of the molded FRP product is not damaged when injecting a coating composition at the succeeding step. Generally, an appropriate molding time is from 20 to 120 seconds.

Thereafter, a coating composition is injected between the upper mold and the surface of the molded product in such an amount as to obtain a desired cured film having a film thickness of preferably from 10 to 500 μm after separating the upper mold from the surface of the molded product to provide such a gap as to be larger than the desired cured film thickness but to be insufficient to break the fitting of the molds, or maintaining the molding pressure or reducing the molding pressure to 10 to 40 kgf/cm$^2$ in the fitting state of the molds.

Thereafter, the molding pressure is maintained or raised to about from 20 to 140 kgf/cm$^2$ while maintaining the heating temperature at the above-mentioned temperature generally for about 30 to 180 seconds so as to obtain a cured film of the coating composition which is completely uniformly coated on the whole surface of the molded product. After forming the cured film on the surface of the molded product in this manner, the mold is opened to take the coated molded product out of the mold.

Thereafter, a plated layer is formed on the surface of the above molded product having the coated film in accordance with a known plating process.

A preferable plating process used in the present invention is explained hereinafter.

That is, as the first stage, the surface of the above coated molded product is subjected to a chemical plating process. The chemical plating process comprises removing impurities on the surface by alkali-degreasing method, washing with water and degreasing with a surfactant-containing solution to improve wetting properties. Thereafter, the surface is etched with an etching liquor comprising a mixture of chromic acid/sulfuric acid to produce anchor-like minute pores on the film surface. Thereafter, the surface is subjected to water-washing, acid-washing and water-washing treatments to remove the chromic acid. Thereafter, the surface is further subjected to catalyst treatment, water-washing treatment, accelerator treatment and water-washing treatment, and the surface is then deposited with nickel in an aqueous solution of nickel chloride/sodium hypophosphite to provide electroconductivity. Finally, the surface is washed with water.

As the second stage, the above treated surface is subjected to an electric plating process. The electric plating process comprises washing with acid, strike-plating to improve electroconductivity and copper-plating to obtain mirror gloss. Thereafter, the surface is subjected to semi-glossy nickel-plating treatment and glossy nickel-plating treatment to improve corrosion resistance and throwing power of the succeeding chrome-plating. Thereafter, the above treated surface is subjected to seal nickel-plating treatment to improve corrosion resistance and is finally subjected to chrome-plating treatment to complete a plated layer.

According to the present invention, the surface of an FRP molded product is coated with the specific coating composition to form a coating film which is effective for improving adhesive properties between the FRP molded product base and a plated layer in a process for plating the FRP molded product, and consequently the plated layer thus obtained has a glossy and smooth surface.

Now, the present invention is further illustrated by the following Examples in detail. The terms "parts" and "%" used in Examples respectively mean "parts by weight" and "% by weight".

Preparation of Coating Compositions A to G

The ingredients (except for a polymerization initiator) shown in Table 1 were kneaded and dispersed, and the polymerization initiator was added just before using, thus preparing Coating Compositions A to G.

TABLE 1

| Coating Composition No. | A | B | C | D | E | F | G |
|---|---|---|---|---|---|---|---|
| Vehicle | | | | | | | |
| Urethaneacrylate oligomer Note[1] | 20 | 24 | 30 | 9 | 2 | 37 | 23 |
| Epoxyacrylate oligomer Note[2] | 15 | 12 | 8 | 21 | 29 | 2 | 17 |
| Styrene | 21 | 20 | 19 | 21 | 25 | 17 | 24 |
| Filler | | | | | | | |
| Calcium carbonate | 34 | 34 | 23 | 23 | 34 | 34 | — |
| Titanium oxide | 8 | 8 | 9 | 7 | 8 | 8 | 9 |
| Talc | — | — | 9 | 7 | — | — | 25 |
| Saturated polyester resin | — | — | — | 10 | — | — | — |
| Zinc stearate | 0.5 | 0.5 | 0.5 | 0.5 | 0.5 | 0.5 | 0.5 |
| Curing accelerator | 0.1 | 0.1 | 0.1 | 0.1 | 0.1 | 0.1 | 0.1 |
| Tertiary butyl peroxy benzoate | 1.4 | 1.4 | 1.4 | 1.4 | 1.4 | 1.4 | 1.4 |

Note[1]:

TABLE 1-continued

| Coating Composition No. | A | B | C | D | E | F | G |
|---|---|---|---|---|---|---|---|

The reaction product of 1 mol of hexamethylene diisocyanate, 1 mol of hydroxyethyl acrylate and 0.5 mol of polypropyrene glycol (number average molecular weight: 1,000).
Note[2]:
Bisphenol A type polyepoxide diacrylate (number average molecular weight: 1,100).

EXAMPLES 1 TO 4 and COMPARATIVE EXAMPLES 1 to 3

A molded product having a coating was produced under the following conditions in accordance, with the molding process and the molding device as described in Japanese Unexamined Patent Publication No. 27392.1/1986.

A chrome-plated flat type test mold having a length of 300 mm and a width of 150 mm was used, and a molding temperature was determined in such a manner as to maintain the upper mold at 150° C. and the lower mold at 145° C.

250 g of an unsaturated polyester type thermosetting glass fiber-reinforced plastic (glass fiber content: 28%) SMC material was charged in the lower mold, and molding was conducted under a molding pressure of 80 kgf/cm² for a molding time of 60 seconds.

Thereafter, the molding pressure was lowered to 30 kgf/cm², and 10 g of each of the above-mentioned coating compositions was injected between the upper mold and the molded product. The molding pressure was then raised to 60 kgf/cm² again, and was maintained for 90 seconds. The mold was then opened, and the coated molded product was taken out. The coated molded product thus obtained was applied with plating in accordance with the chemical plating process and the electric plating process as shown in the following Tables 2 and 3.

TABLE 2

| | Chemical Plating Process | |
|---|---|---|
| No. | Item | Treating liquor, treating condition |
| 1 | Degreasing | Alkali-degreasing, 40° C., 4 minutes |
| 2 | Water-washing | |
| 3 | Degreasing | Surface active agent, 40° C., 4 minutes |
| 4 | Etching | Chromic acid/sulfuric acid mixture aqueous solution, 65° C., 5 minutes |
| 5 | Water-washing | |
| 6 | Acid-washing | Hydrochloric acid/hydrazine mixture aqueous solution, 40° C., 4 minutes |
| 7 | Water-washing | |
| 8 | Catalyst | Palladium chloride/stannous chloride/hydrochloric acid mixture aqueous solution, 23° C., 4 minutes |
| 9 | Water-washing | |
| 10 | Accelerator | Sulfuric acid/hydrazine mixture aqueous solution |
| 11 | Water-washing | |
| 12 | Chemical nickel plating | Nichel chloride/sodium hypophosphite mixture aqueous solution |
| 13 | Water-washing | |

TABLE 3

Electric Plating Process

| No. | Item | Treating liquor, treating condition |
|---|---|---|
| 1 | Acid-washing | |
| 2 | Strike plating | Potassium oxalate, potassium pyrophosphate mixture aqueous solution, pH 9, 30° C. |
| 3 | Copper plating | Copper sulfate/sulfuric acid mixture aqueous solution, 23° C. |
| 4 | Semi-glossy nickel plating | Nickel sulfate, nickel chloride, sulfur-boric acid mixture aqueous solution, pH 4.0, 53° C. |
| 5 | Glossy nickel plating | Nickel sulfate, nickel chloride, boric acid mixture aqueous solution, pH 4.0, 55° C. |
| 6 | Seal nickel plating | Nickel sulfate, nickel chloride, powder, boric acid mixture aqueous solution, pH 4.0, 53° C. |
| 7 | Chrome plating | Chromic acid/sulfuric acid mixture aqueous solution, 40° C. |

The molded product thus plated was subjected to respective tests to measure plated area, gloss, smoothness and adhesive properties of the plated layer, and the results are shown in the following Table 4.

TABLE 4

| | Example | | | | Comparative Example | | |
|---|---|---|---|---|---|---|---|
| | 1 | 2 | 3 | 4 | 1 | 2 | 3 |
| | \multicolumn{7}{c}{Coating composition No.} | | | | | | |
| | A | B | C | D | E | F | G |
| Plated area (%) | 100 | 100 | 100 | 100 | 100 | 100 | 95 |
| Gloss Note[3] | 8 | 7 | 7 | 8 | 7 | 5 | 7 |
| Smoothness Note[4] (μm) | 0.10 | 0.12 | 0.10 | 0.08 | 0.12 | 0.24 | 0.10 |
| Adhesive properties Note[5] (g/cm) | 670 | 800 | 780 | 1,030 | 260 | 400 | 200 |

Note[3]:
Gloss was visually evaluated in the following manner. A fluorescent lamp placed 2 m apart from a test piece was reflected on the test piece, and the reflected image was evaluated by 5 panelists. the evaluation results were classified into the following 10 ranks, and the average value was made to be a gloss value.
Rank 10: The image of the fluorescent lamp is clearly reflected on the test piece in the same manner as a mirror.
Rank 8: The reflected image of the fluorescent lamp is slightly blur.
Rank 5: The reflected image of the fluorescent lamp is blur.
Rank 3: The reflected image of the fluorescent lamp is substantially blur.
Rank 1: The image of the fluorescent lamp is not reflected on the test piece.
*Ranks having no definitions are intermediate between the above defined Ranks.
Note[4]:
Smoothness was evaluated by an average roughness (Ra) at the center line in accordance with JIS B 0601.
Note[5]:
A plated layer was scratched at a width of 10 mm with a cutter knife, and the scratched end was chucked with a tensile tester to conduct a tensile test at an angle of 90°, thus measuring adhesive properties.

As evident from the above Table 4, all of Examples 1 to 4 of the present invention provided completely plated layers having satisfactory gloss, smoothness and adhesive properties.

On the other hand, Comparative Example 1 containing an excess amount of epoxy acrylate oligomer provided poor adhesive properties; Comparative Example 2 containing an excess amount of urethane acrylate oligomer provided poor gloss, smoothness and adhesive properties; and Comparative Example 3 containing no calcium carbonate provided unplated parts and poor adhesive properties.

We claim:

1. A method for producing a molded product comprising:
   i) molding a fiber-reinforced plastic material in a mold in the presence of heat and under pressure to form a molded product;
   ii) injecting a coating composition into said mold to form a coating film on the surface of said molded product in the presence of heat and under pressure to form a coated molded product;
   iii) taking said coated molded product., thus obtained, out of said mold; and
   iv) plating the surface of said coated molded product; wherein said coating composition comprises:
      a) a vehicle component comprising:
         i) a polymerizable unsaturated monomer; and
         ii) 20 to 60% by weight on the basis of the total coating composition of an oligomer mixture of
            a') urethane acrylate oligomer; and
            b') epoxy acrylate oligomer;
            wherein the weight ratio of a'/b' is from 90/10–10/90; and
      b) 10 to 50% by weight on the basis of the total coating composition of calcium carbonate.

2. The method according to claim 1, wherein the weight ratio of the oligomer mixture/the polymerizable unsaturated monomer ranges from 30/70 to 90/10.

3. The method according to claim 1, wherein the number average molecular weight of said oligomer mixture is from 300 to 3,000.

4. The method of claim 1, wherein said urethane acrylate oligomer is prepared by reacting an organic diisocyanate, an organic diol and a hydroxy-containing (methacrylate).

5. The method of claim 1, wherein said epoxy acrylate oligomer is prepared by reacting a polyepoxide with a stoichiometrically equivalent amount of acrylic acid or methacrylic acid.

6. The method of claim 1, wherein said filler component has an average particle size of not larger than 10 μm.

7. The method of claim 1, wherein said vehicle component comprises 30–70% by weight of the coating composition.

8. The method of claim 1, wherein said coating film has a thickness of from 10–500 μm.

9. The method of claim 1, wherein the mold pressure in step i) is 50–250 kgs/cm$^2$ and the molding pressure in step ii) is 10–40 kgs/cm$^2$.

* * * * *

UNITED STATES PATENT AND TRADEMARK OFFICE
CERTIFICATE OF CORRECTION

PATENT NO. : 5,496,509
DATED : March 5, 1996
INVENTOR(S) : Naotaka YAMAMOTO et al.

It is certified that error appears in the above-indentified patent and that said Letters Patent is hereby corrected as shown below:

On the title page, Item [21], the Application number is incorrect. It should read:

--[21] Appl. No.: 312,079--

Signed and Sealed this

Twenty-eighth Day of May, 1996

Attest:

BRUCE LEHMAN

Attesting Officer   Commissioner of Patents and Trademarks